(12) United States Patent
Watanabe et al.

(10) Patent No.: US 11,148,729 B2
(45) Date of Patent: Oct. 19, 2021

(54) LOWER STRUCTURE OF VEHICLE

(71) Applicant: HONDA MOTOR CO., LTD., Tokyo (JP)

(72) Inventors: Tomoo Watanabe, Wako (JP); Kanji Kaneko, Wako (JP); Akira Haga, Wako (JP); Shungo Chino, Wako (JP); Keisuke Gonda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 118 days.

(21) Appl. No.: 16/558,445

(22) Filed: Sep. 3, 2019

(65) Prior Publication Data
US 2020/0086929 A1    Mar. 19, 2020

(30) Foreign Application Priority Data

Sep. 14, 2018    (JP) .............................. JP2018-172514

(51) Int. Cl.
*B62D 25/20* (2006.01)
*B60K 1/04* (2019.01)

(52) U.S. Cl.
CPC ............ *B62D 25/2036* (2013.01); *B60K 1/04* (2013.01); *B62D 25/2018* (2013.01); *B62D 25/2027* (2013.01); *B60K 2001/0438* (2013.01)

(58) Field of Classification Search
CPC ............ B62D 25/2036; B62D 25/2018; B62D 25/2027; B60K 1/04; B60K 2001/0438
See application file for complete search history.

(56) References Cited

U.S. PATENT DOCUMENTS

| | | | |
|---|---|---|---|
| 8,939,246 B2 * | 1/2015 | Yamaguchi | B60L 50/66 180/68.5 |
| 9,227,582 B2 * | 1/2016 | Katayama | B60L 3/0046 |
| 9,956,994 B2 * | 5/2018 | Kageyama | B62D 25/20 |
| 2012/0006607 A1 * | 1/2012 | Ohashi | B60L 1/003 180/65.31 |
| 2017/0197667 A1 * | 7/2017 | Kabayama | B62D 25/2027 |

(Continued)

FOREIGN PATENT DOCUMENTS

| | | |
|---|---|---|
| JP | 07-187016 | 7/1995 |
| JP | 11-078991 | 3/1999 |

(Continued)

OTHER PUBLICATIONS

Japanese Office Action for Japanese Patent Application No. 2018-172514 dated Mar. 3, 2020.

*Primary Examiner* — Lori L Lyjak
(74) *Attorney, Agent, or Firm* — Amin, Turocy & Watson, LLP

(57) ABSTRACT

A lower structure of a vehicle includes front side frames, a vehicle body strength member, a floor panel, and a power supply unit, in which the front side frames are formed to have cross-sectional shapes that open upward at least at rear sections thereof, the power supply unit is disposed below a floor panel, the floor panel includes a pair of reinforcing panel portions which are respectively joined to the rear sections of the front side frames and cover the rear sections from above, and a floor panel main body portion which constitutes a portion other than the reinforcing panel portions, and the reinforcing panel portions are formed to have higher strength than the floor panel main body portion.

5 Claims, 7 Drawing Sheets

(56) References Cited

U.S. PATENT DOCUMENTS

| | | |
|---|---|---|
| 2018/0194212 A1 | 7/2018 | Hamilton et al. |
| 2018/0236863 A1* | 8/2018 | Kawabe ............... B62D 25/025 |
| 2018/0237075 A1* | 8/2018 | Kawabe .................. B60K 1/04 |

FOREIGN PATENT DOCUMENTS

| | | |
|---|---|---|
| JP | 2005-119492 | 5/2005 |
| JP | 2006-224877 | 8/2006 |
| JP | 2009-286331 | 12/2009 |
| JP | 2013-124023 | 6/2013 |

* cited by examiner

LOWER STRUCTURE OF VEHICLE

CROSS-REFERENCE TO RELATED APPLICATION

Priority is claimed on Japanese Patent Application No. 2018-172514, filed Sep. 14, 2018, the content of which is incorporated herein by reference.

BACKGROUND OF THE INVENTION

Field of the Invention

The present invention relates to a lower structure of a vehicle in which a power supply unit such as a battery is mounted below a floor panel.

Description of Related Art

For a lower structure of a vehicle driven by electric power of an electric car or the like, a configuration in which a power supply unit such as a battery is disposed below a floor panel is known (for example, see Japanese Patent Application Laid-open No. 2006-224877 (hereinafter referred to as Patent Document 1), etc.).

In the lower structure of the vehicle described in Patent Document 1, extension frames are joined to rear portions of a pair of left and right front side frames disposed in a front portion of a vehicle body, and a unit frame supporting the power supply unit is mounted on left and right extension frames. Rear sections of the front side frames and the extension frames are formed to have cross-sectional shapes in substantially U shapes (substantially hat shapes) that open upward. A floor panel made of a steel plate is joined to upper surfaces of the rear sections of the front side frames and the extension frames. The power supply unit is disposed between the left and right extension frames below the floor panel with the unit frame therebetween.

SUMMARY OF THE INVENTION

However, in the lower structure of the vehicle described in Patent Document 1, since the rear sections of the left and right front side frames have cross-sectional shapes that open upward, in order to reliably protect the power supply unit against an impact load input from the front, it is unavoidable to enlarge cross-sections of the front side frames. However, when the cross-sections of the front side frames are enlarged, a mounting space for the power supply unit below the floor panel is narrowed.

Aspects of the present invention have been made in view of the above circumstances and it is an object of the present invention to provide a lower structure of a vehicle in which an impact load from the front can be reliably received by portions of front side frames while enlargement of the cross-sections of the front side frames is avoided.

In order to achieve the above object, the present invention adopts the following configurations.

(1) A lower structure of a vehicle according to an aspect of the present invention is a lower structure of a vehicle including a pair of left and right front side frames which extend substantially in a longitudinal direction of a vehicle body in a front portion of the vehicle and are formed to have cross-sectional shapes that open upward at least at rear sections thereof, a vehicle body strength member coupled to a rear end portion of each of the front side frames, a floor panel which is disposed below a passenger compartment and has a part of a front section thereof joined to the rear sections of the pair of front side frames, and a power supply unit disposed below the floor panel. The floor panel includes a pair of reinforcing panel portions which are respectively joined to the rear sections of the front side frames and cover the rear sections from above, and a floor panel main body portion which constitutes a portion other than the reinforcing panel portions. The reinforcing panel portions are formed to have a higher strength than that of the floor panel main body portion.

According to the above aspect (1), the rear sections of the front side frames are covered with the reinforcing panel portions of the floor panel from above. Since the reinforcing panel portions are formed to have a higher strength than the floor panel main body portion, the strength of the rear sections of the front side frames can be enhanced without enlarging cross-sections of the front side frames. Therefore, when an impact load is input from a front portion side of the front side frames, the impact load is reliably transmitted to the vehicle body strength member via the front side frames and the reinforcing panel portions of the floor panel. Therefore, without enlarging the cross-sections of the front side frames, the impact load input from the front of the vehicle can be reliably received by the front side frames, and the impact load can be absorbed in front sections of the front side frames.

(2) In the above aspect (1), a pair of left and right side sills that extend downward below side portions of the passenger compartment may be further included, the respective rear end portions of the front side frames may be coupled to the corresponding left and right side sills constituting the vehicle body strength member, and the respective reinforcing panel portions may be joined to the corresponding left and right side sills.

In the case of the above aspect (2), when an impact load is input to the front side frames from the front, the load is efficiently transmitted to the corresponding left and right side sills which are strength members for the side portions of the vehicle body via the front side frames and the reinforcing panel portions. Therefore, in the case of adopting this configuration, the impact load can be efficiently absorbed in the front sections of the front side frames.

(3) In the above aspect (2), a dashboard panel which is raised upward from a front portion of the floor panel and partitions a front portion of the passenger compartment may be further included, and each of the reinforcing panel portions may be joined to the dashboard panel.

In the case of the above aspect (3), when an impact load is input from the front of the vehicle, rearward displacement of the dashboard panel can be restricted by the reinforcing panel portions.

(4) In the above aspect (2) or (3), front pillars which are raised upward from a front portion of each side sill may be further included, and the reinforcing panel portions may be joined respectively to the corresponding left and right front pillars.

In the case of the above aspect (4), when an impact load is input to the front side frames from the front, the load is also transmitted to the corresponding left and right front pillars via the front side frames and the reinforcing panel portions. In the case of adopting this configuration, the impact load input to the front side frames can be reliably received by the corresponding left and right side sills and front pillars, and thus the impact load can be absorbed more efficiently in the front sections of the front side frames.

(5) In the above aspect (3), the reinforcing panel portions may be reinforcing beads extending from the dashboard panel toward the side sills.

In the case of the above aspect (5), the strength of the reinforcing panel portions in a load transfer direction can be enhanced by the reinforcing beads. Therefore, in the case of adopting this configuration, the impact load input to the front side frames from the front can be more efficiently transmitted to the other vehicle body strength members.

(6) In any one of the above aspects (1) to (5), each of the rear sections of the front side frames may have a rear frame part disposed on a rear end side thereof, and a front frame part connected to a front portion side of the rear frame part, and each of the reinforcing panel portions may be joined to the rear frame part and the front frame part across a connection portion between the rear frame part and the front frame part.

In the case of the above aspect (6), the high strength reinforcing panel portion is connected to the front frame part and the rear frame part across the connection portion between the front frame part and the rear frame part. Accordingly, when an impact load is input to the front frame part from the front, some of the load transmitted from the front frame part to the rear frame part is sustained by the reinforcing panel portion. For this reason, in the case of adopting this configuration, the load applied to the connection portion can be reduced when the load is input.

(7) In the above aspect (6), a sub-frame mount for mounting a sub-frame on the front side frames may be further included, and the sub-frame mount may be joined to the rear frame part and the front frame part across the connection portion.

In the case of the above aspect (7), since the sub-frame mount is joined to the rear frame part and the front frame part across the connection portion, some of the load transmitted from the front frame part to the rear frame part can be also sustained by the sub-frame mount. Therefore, in the case of adopting this configuration, the load applied to the connection portion can be further reduced when the load is input.

According to the aspects of the present invention, since the rear sections of the front side frames are covered with the high strength reinforcing panel portions of the floor panel from above, an impact load from the front can be reliably received by portions of the front side frames while enlargement of the cross-sections of the front side frames is avoided.

DESCRIPTION OF EMBODIMENTS

Figure 1:
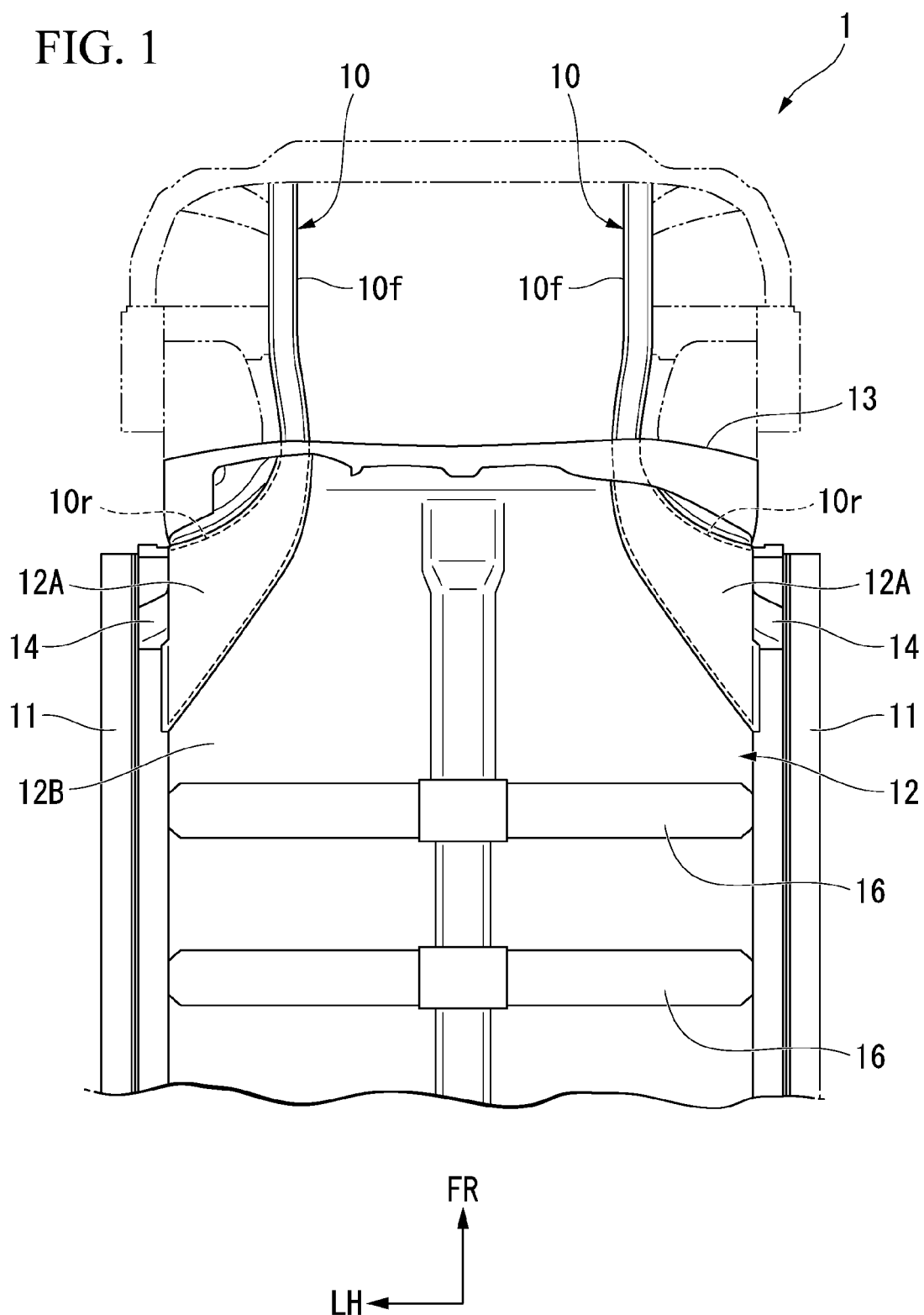
FIG. 1 is a top view of a lower structure of a vehicle according to an embodiment of the present invention.

Hereinafter, an embodiment of the present invention will be described with reference to the drawings. Also, in the drawings, an arrow FR indicating a forward direction in a vehicle 1, an arrow UP indicating an upward direction in the vehicle 1, and an arrow LH indicating a leftward direction in the vehicle 1 are shown as appropriate.

Figure 2:
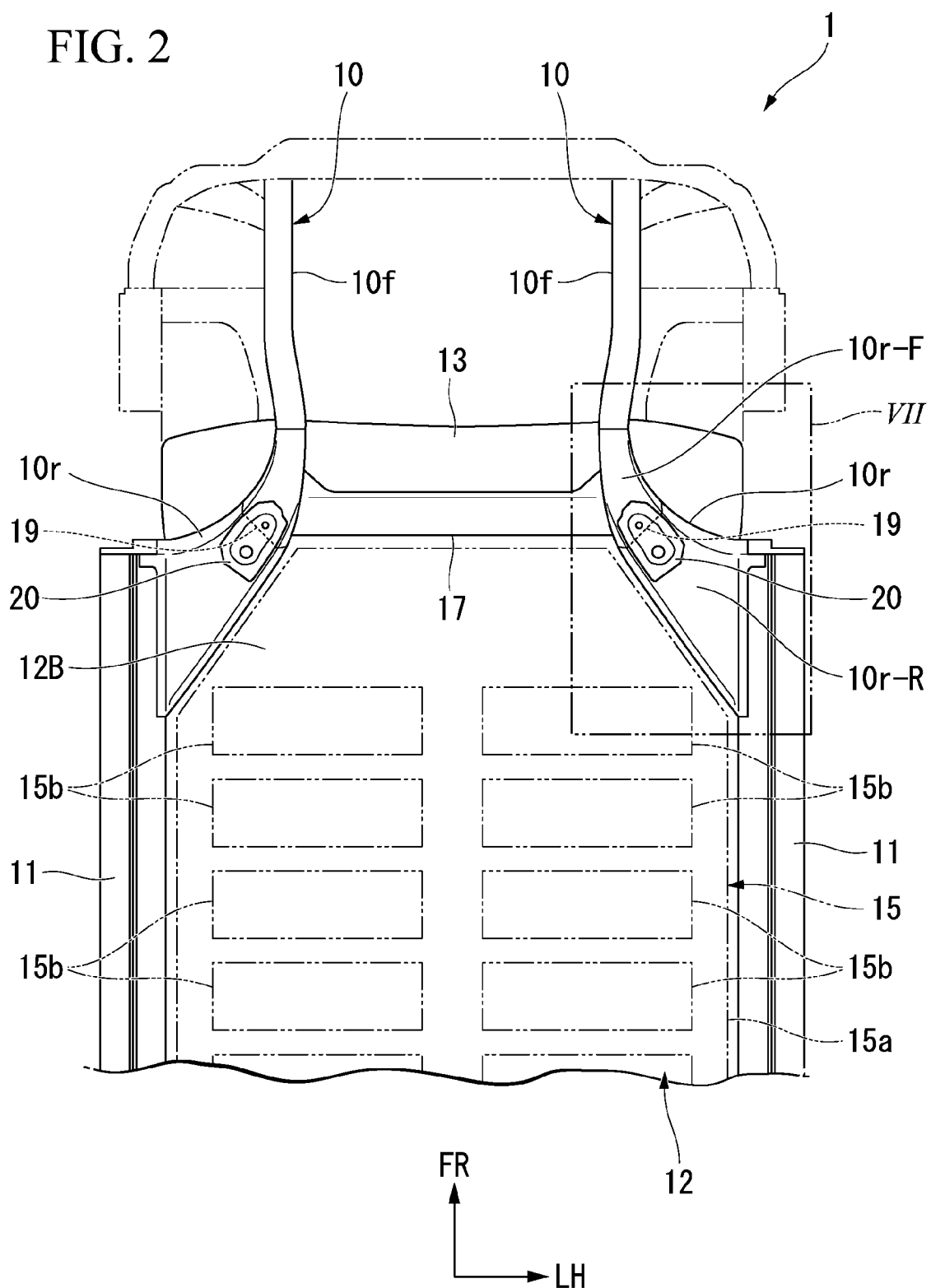
FIG. 2 is a bottom view of the lower structure of the vehicle according to the embodiment of the present invention.

FIG. 1 is a view showing a lower structure of a front section of a vehicle 1 when viewed from above, and FIG. 2 is a view showing the lower structure of the front section of the vehicle 1 when viewed from below.

A pair of left and right front side frames 10 extending substantially in a longitudinal direction of a vehicle body are disposed in a front section of the vehicle 1. At least rear sections 10r of the left and right front side frames 10 are formed to have cross-sectional shapes that open upward in substantially U shapes (substantially hat shapes). The vehicle 1 of the present embodiment is an electric vehicle driven by a motor (not shown), and a motor for driving the vehicle is mounted between front sections 10f of the left and right front side frames 10 via a sub-frame (not shown).

The front sections 10f of the left and right front side frames 10 extend in straight line shapes substantially in the longitudinal direction of the vehicle body. On the other hand, the rear sections 10r of the left and right front side frames 10 are curved outward in a vehicle width direction toward the rear of the vehicle. In addition, rear end portions of the respective rear sections 10r are connected to corresponding left and right side sills 11 (another vehicle body strength member) disposed below a side portion of a passenger compartment. Also, each of the rear sections 10r of the left and right front side frames 10 is formed to have a cross-sectional shape of substantially a U shape (substantially hat shape) as described above, and its width in a direction intersecting the extending direction thereof gradually increases toward the rear of the vehicle.

A floor panel 12 disposed below the passenger compartment is mounted on inner edge portions of the left and right side sills 11 in the vehicle width direction. Left and right side edge portions of the floor panel 12 are fixed by welding to corresponding upper surfaces of the left and right side sills 11. In addition, a front edge portion of the floor panel 12 is fixed by welding to upper surfaces of the rear sections 10r of the left and right front side frames 10 and is fixed by welding to a lower edge of a dashboard panel 13. The dashboard panel 13 rises upward from a front portion of the floor panel 12 and divides the passenger compartment from a motor compartment. Further, lower ends of front pillars 14 rising upward from front portions of the left and right side sills 11 are fixed by welding to the front portions of the left and right side sills 11. Also, the reference numeral 16 in FIG. 1 is a floor cross member joined to an upper surface of the floor panel 12.

As shown in FIG. 2, a battery unit 15 is disposed below the floor panel 12. The battery unit 15 constitutes a power supply unit in the vehicle 1 of the present embodiment. The battery unit 15 has a plurality of batteries 15b accommodated in a battery case 15a, and the battery case 15a is coupled to the left and right side sills 11. Also, the reference numeral 17 in FIG. 2 is a cross member which connects the rear sections 10r of the left and right front side frames 10.

Figure 3:
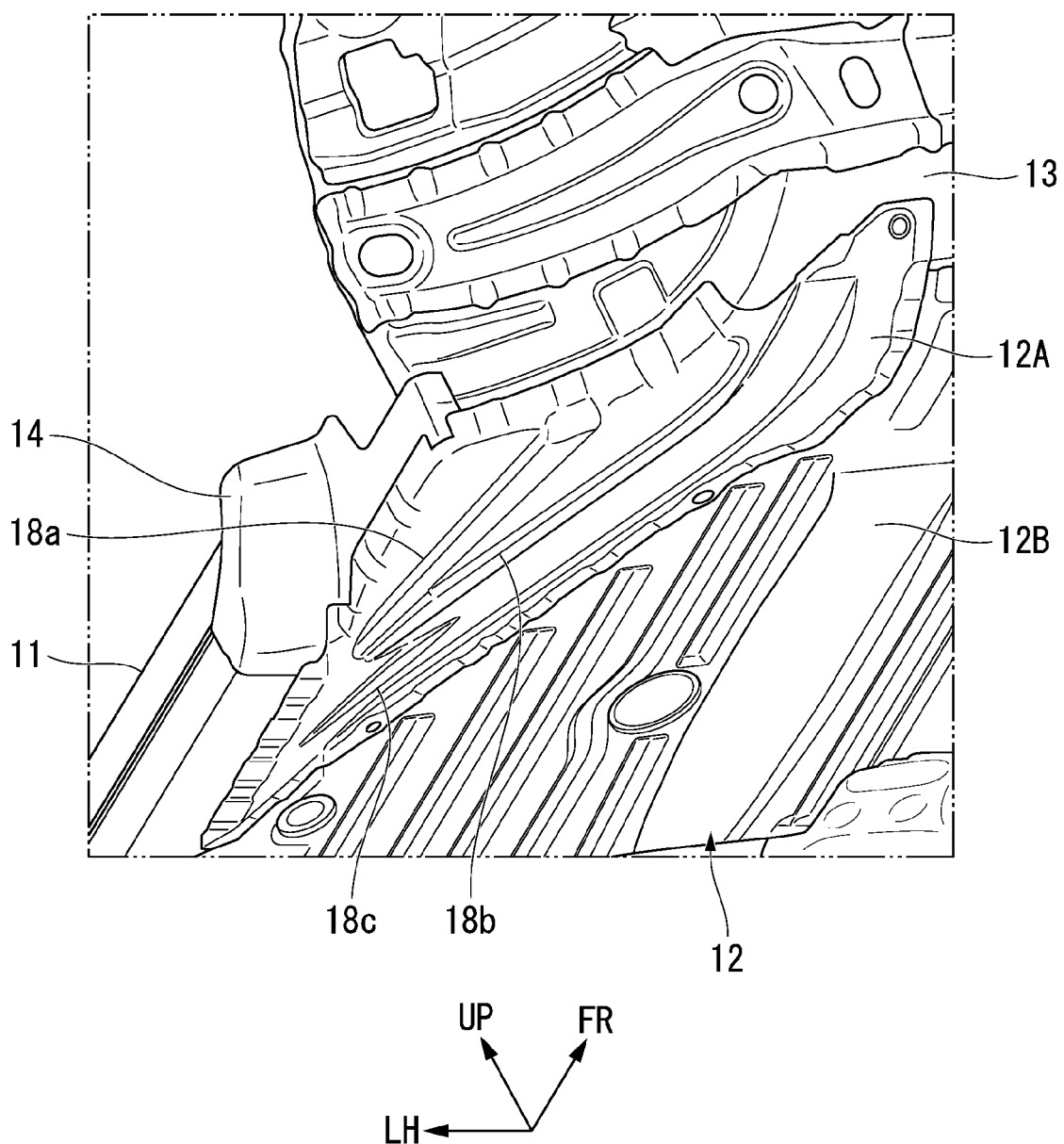
FIG. 3 is a perspective view showing part of the lower structure of the vehicle according to the embodiment of the present invention.
Figure 4:
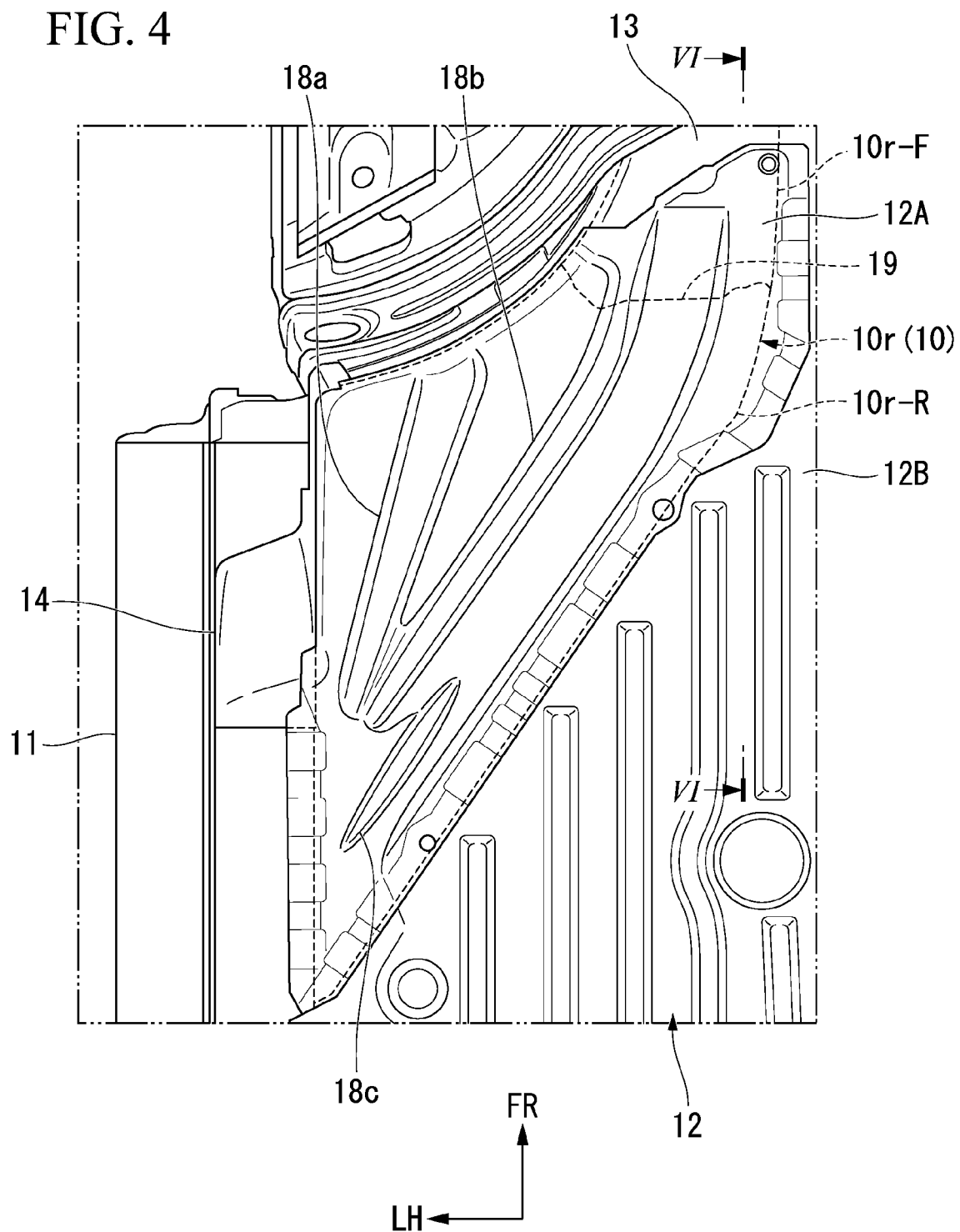
FIG. 4 is a top view showing part of the lower structure of the vehicle according to the embodiment of the present invention.

FIG. 3 is a view showing the vicinity of a left side portion of the floor panel 12 when viewed obliquely above a rear portion thereof, and FIG. 4 is a view showing the vicinity of the left side portion of the floor panel 12 when viewed from above. Also, FIG. 5 is a view similar to FIG. 4 with some components removed, and FIG. 6 is a cross-sectional view taken along line VI-VI of FIG. 4.

As also shown in these figures, the floor panel 12 includes a pair of left and right reinforcing panel portions 12A which are welded to the respective upper surfaces (flange portions 10rf) of the rear sections 10r of the left and right front side frames 10 and close the rear sections 10r from above, and a floor panel main body portion 12B which constitutes part other than the reinforcing panel portions 12A.

Figure 5:
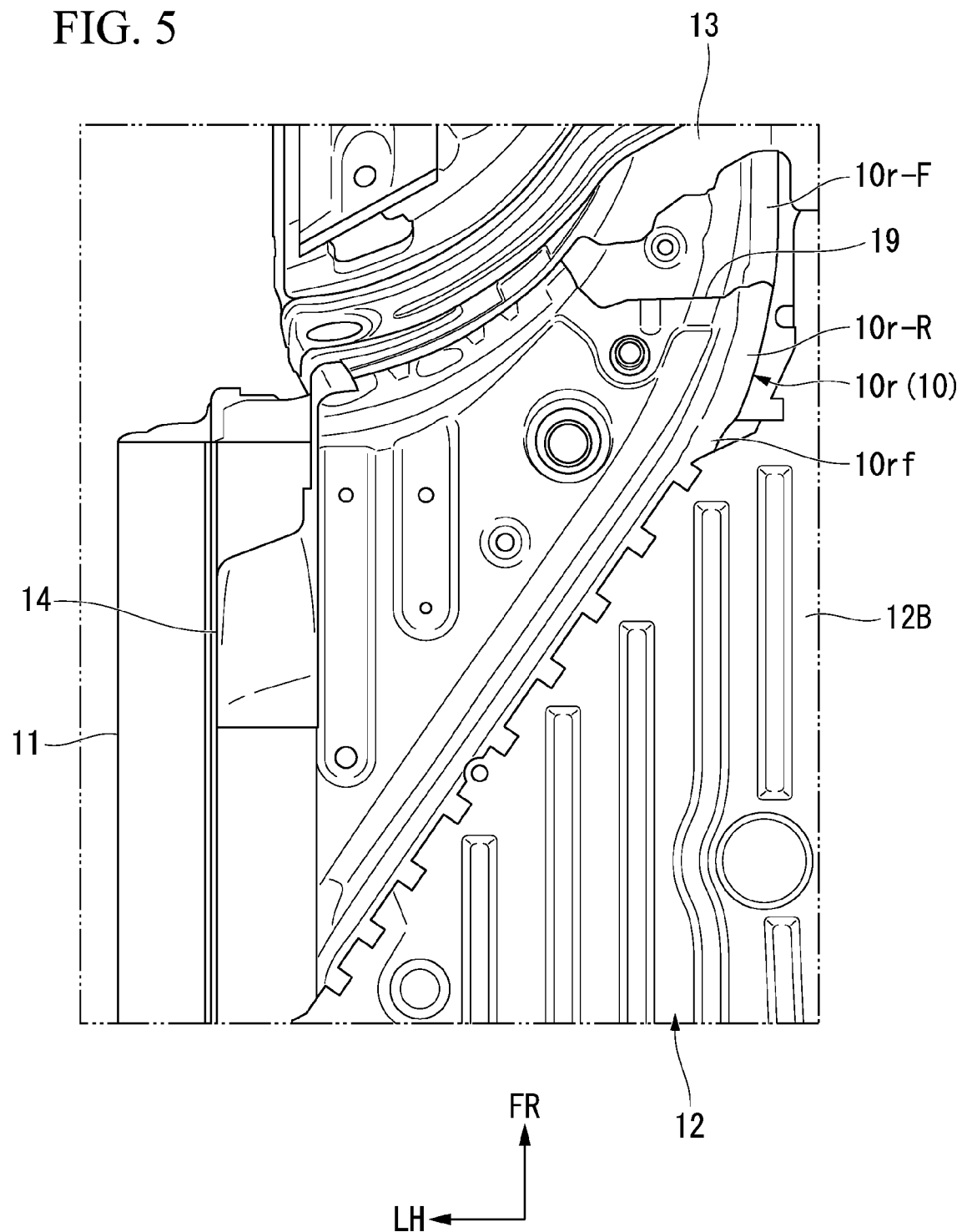
FIG. 5 is a top view showing part of the lower structure of the vehicle according to the embodiment of the present invention.
Figure 6:
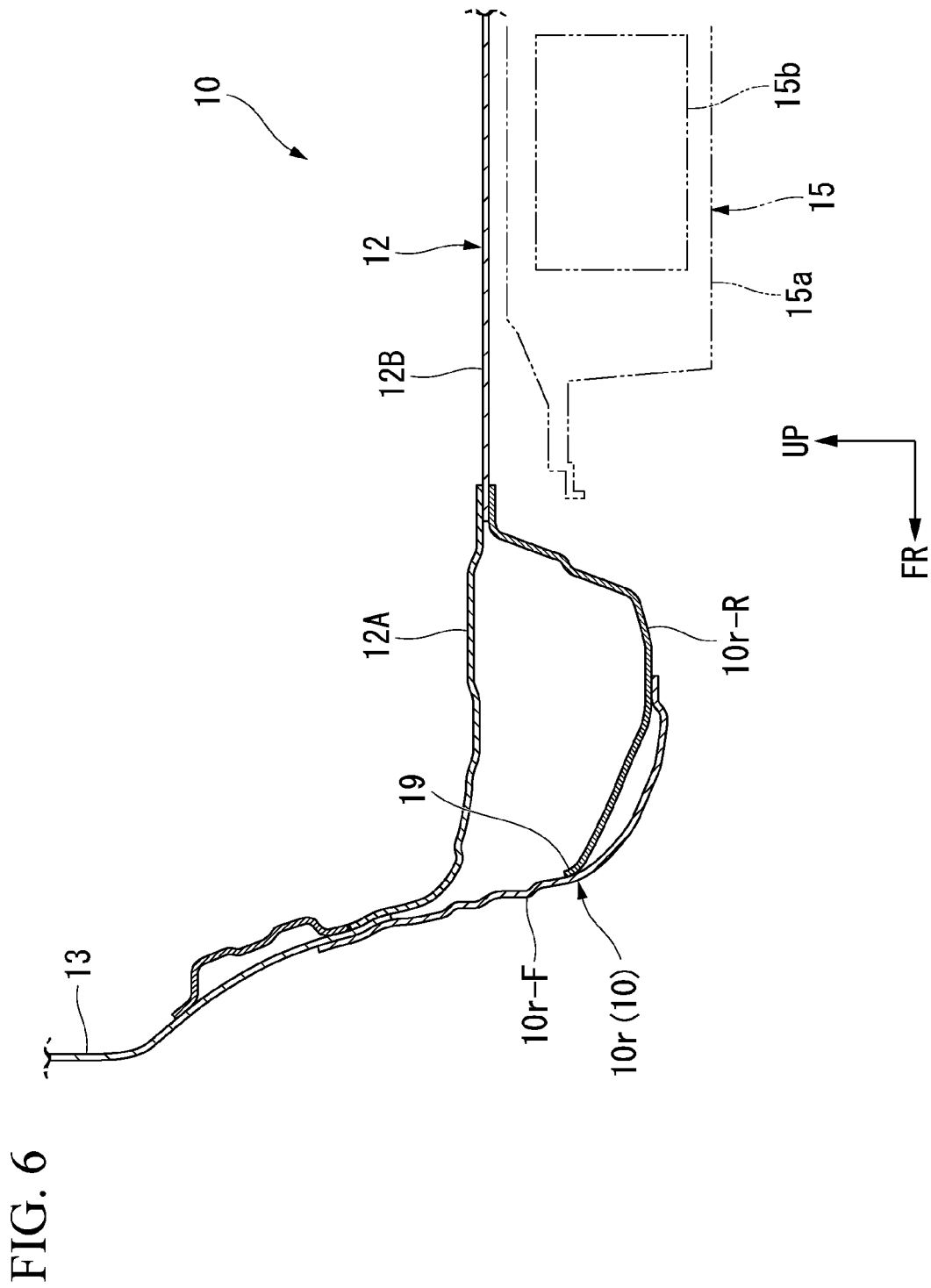
FIG. 6 is a cross-sectional view taken along line VI-VI of FIG. 4 in the vehicle according to the embodiment of the present invention.

Also, FIG. 5 shows a state in which the reinforcing panel portions 12A are removed as compared with FIG. 4.

The floor panel main body portion 12B is configured of a single or a plurality of panel members which consist of usual steel materials. On the other hand, the reinforcing panel portions 12A are made of a panel material made of high-tensile steel or the like which has a higher strength than the floor panel main body portion 12B. Left and right front edge portions of the floor panel main body portion 12B are fixed by welding to the flange portions 10rf at inner edges of the rear sections 10r of the corresponding left and right front side frames 10, as shown in FIG. 5. In this state, the reinforcing panel portions 12A are fixed by welding to the upper surfaces of the rear sections 10r of the front side frames 10. In addition, the reinforcing panel portions 12A may be made of the same steel material as the floor panel main body portion 12B, and the reinforcing panel portions 12A may be made thicker than the floor panel main body portion 12B to achieve a higher strength. Also, a patch or the like of another member may be provided on the reinforcing panel portions 12A to achieve a higher strength.

Front edge portions of the left and right reinforcing panel portions 12A are fixed by welding to a rear surface of a raised portion of the dashboard panel 13. Also, side edge portions of the left and right reinforcing panel portions 12A on an outer side in the vehicle width direction are fixed by welding to the corresponding left and right side sills 11 and front pillars 14.

Here, the left and right reinforcing panel portions 12A are formed to conform to substantially top view shapes of the rear sections 10r of the front side frames 10, and obliquely extend outward in the vehicle width direction from front end portions toward rear end portions thereof. Three reinforcing beads 18a, 18b and 18c are formed on each of the left and right reinforcing panel portions 12A along respective extending directions of the reinforcing panel portions 12A. Three reinforcing beads 18a, 18b and 18c extend from the dashboard panel 13 towards the side sill 11. The reinforcing beads 18a, 18b and 18c are formed to project on upper surfaces of the reinforcing panel portions 12A. These reinforcing beads 18a, 18b and 18c are formed along the extending directions of the reinforcing panel portions 12A, thereby enhancing the strength in directions along the extending directions of the reinforcing panel portions 12A.

Figure 7:
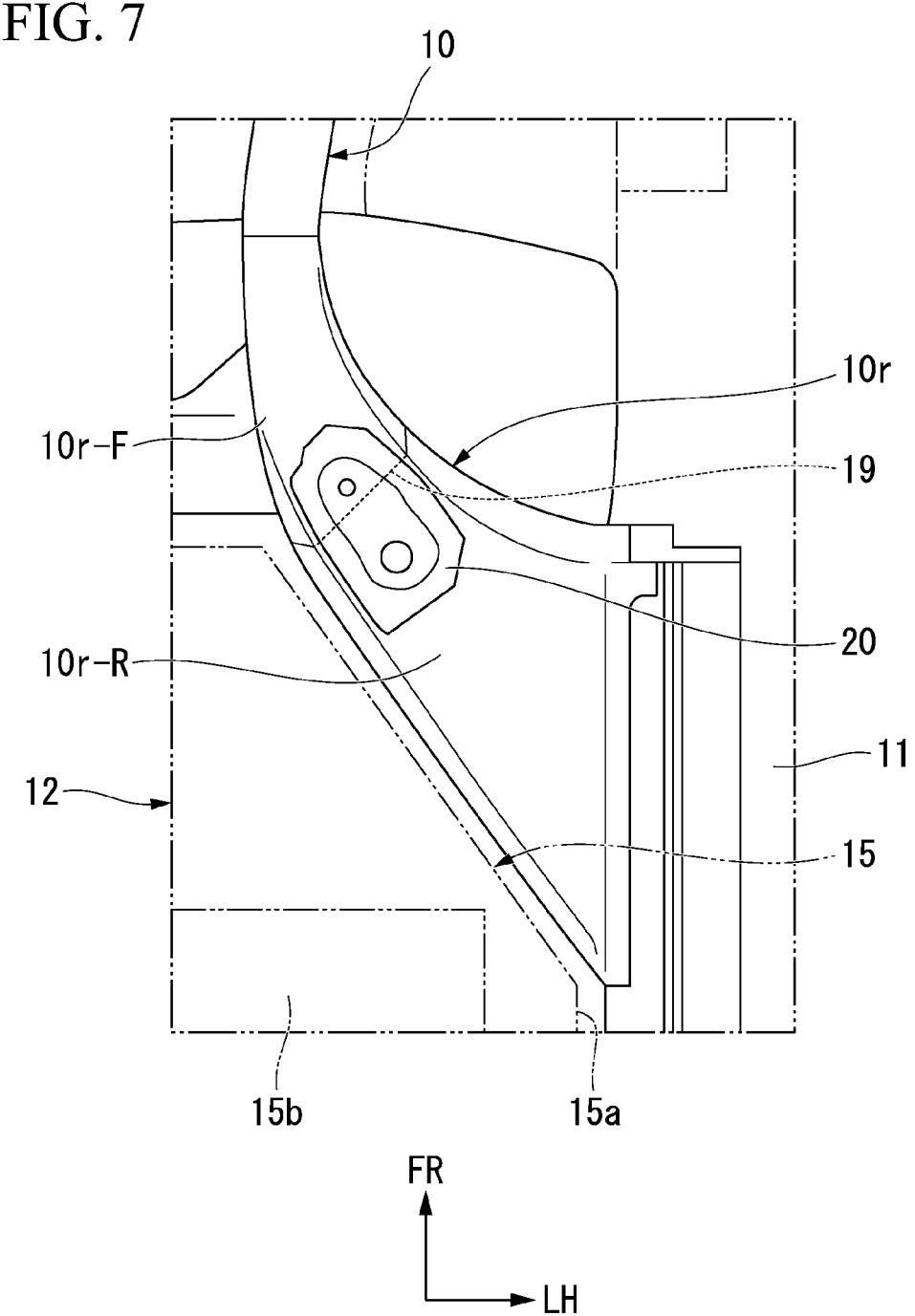
FIG. 7 is an enlarged view of a portion VII of FIG. 2 in the vehicle according to the embodiment of the present invention.

FIG. 7 is an enlarged view showing a portion VII of FIG. 2.

As shown in FIGS. 4, 5 and 7, each of the rear sections 10r of the front side frames 10 has a rear frame part 10r-R disposed on a rear end side thereof, and a front frame part 10r-F joined to a front portion of the rear frame part 10r-R. The rear frame part 10r-R and the front frame part 10r-F are fixed by welding in a state where they overlap in the longitudinal direction. The reinforcing panel portion 12A disposed on the upper surface of the rear section 10r is joined across a connection portion 19 between the rear frame part 10r-R and the front frame part 10r-F on upper surfaces of the rear frame part 10r-R and the front frame part 10r-F.

Also, as shown in FIGS. 2 and 7, sub-frame mounts 20 for mounting a sub-frame (not shown) are attached to lower surfaces of the rear sections 10r of the front side frames 10. For example, a driving motor, a suspension component, and the like are attached to the sub-frame. The sub-frame mount 20 is joined across the connection portion 19 of the rear frame part 10r-R and the front frame part 10r-F on lower surfaces of the rear frame part 10r-R and the front frame part 10r-F.

As described above, in the lower structure of the vehicle 1 according to the present embodiment, the floor panel 12 includes the reinforcing panel portions 12A and the floor panel main body portion 12B, the reinforcing panel portions 12A being joined to the respective upper surfaces of the rear sections 10r of the left and right front side frames 10 to close the rear sections 10r from above. In addition, each of the left and right reinforcing panel portions 12A is formed to have a higher strength than that of the floor panel main body portion 12B.

For this reason, in the lower structure of the vehicle 1 according to the present embodiment, the upper portions of the rear sections 10r of the front side frames 10 are closed with the high strength reinforcing panel portions 12A of the floor panel 12. Therefore, in the case of adopting the lower structure of the vehicle 1 according to the present embodiment, an impact load from the front can be reliably received by portions of the front side frames 10 while enlargement of the cross-sections of the front side frames 10 is avoided, and thus the impact load can be absorbed by the front sections 10f of the front side frames 10.

Also, in the lower structure of the vehicle 1 according to the present embodiment, the rear end portions of the left and right front side frames 10 are coupled to the corresponding left and right side sills 11, and the left and right reinforcing panel portions 12A of the floor panel 12 are joined to the corresponding left and right side sills 11. For this reason, when an impact load is input to the front side frames 10 from the front, the impact load can be efficiently transmitted to the corresponding left and right side sills 11 via the front side frames 10 and the reinforcing panel portions 12A. Therefore, in the case of adopting the lower structure of the vehicle 1 according to the present embodiment, the impact load can be efficiently absorbed by the front sections 10f of the front side frames 10.

Also, in the lower structure of the vehicle 1 according to the present embodiment, each of the left and right reinforcing panel portions 12A of the floor panel 12 is also joined to the dashboard panel 13. For this reason, when an impact load is input from the front of the vehicle, rearward displacement of the dashboard panel 13 can be restricted by the reinforcing panel portions 12A.

Further, in the lower structure of the vehicle 1 according to the present embodiment, the left and right reinforcing panel portions 12A of the floor panel 12 are also joined to the corresponding left and right front pillars 14. For this reason, when an impact load is input to the front side frames 10 from the front, the impact load can be transmitted to the corresponding left and right front pillars 14 via the front side frames 10 and the reinforcing panel portions 12A. Therefore, in the case of adopting the lower structure of the vehicle 1 according to the present embodiment, the impact load input to the front side frames 10 from the front can be reliably received by the corresponding left and right side sills 11 and front pillars 14, and thus the impact load can be absorbed more efficiently in the front sections 10f of the front side frames 10.

Furthermore, in the lower structure of the vehicle 1 according to the present embodiment, the reinforcing beads 18a, 18b and 18c extending from the dashboard panel 13 toward the side sills 11 are formed in the reinforcing panel portions 12A. For this reason, the strength of the reinforcing panel portions 12A in a load transfer direction can be enhanced by the reinforcing beads 18a, 18b and 18c. Therefore, in the case of adopting the lower structure of the vehicle 1 according to the present embodiment, an impact load input to the front side frames 10 from the front can be efficiently transmitted to the side sills 11 without causing an increase in the number of components and weight.

Moreover, in the lower structure of the vehicle 1 according to the present embodiment, each of the rear sections 10r of the front side frames 10 has the rear frame part 10r-R and the front frame part 10r-F, and each of the reinforcing panel portions 12A is joined to the rear frame part 10r-R and the front frame part 10r-F across the connection portion 19 between the rear frame part 10r-R and the front frame part 10r-F. For this reason, when an impact load is input to the front frame part 10r-F from the front, some of the load transmitted from the front frame part 10r-F to the rear frame part 10r-R is sustained by the reinforcing panel portions 12A. Therefore, in the case of adopting the lower structure of the vehicle 1 according to the present embodiment, the load applied to the connection portion 19 can be reduced when an impact load is input.

Also, the lower structure of the vehicle 1 according to the present embodiment, the sub-frame mount 20 for mounting the sub-frame is joined to the rear frame part 10r-R and the front frame part 10r-F across the connection portion 19. For this reason, when an impact load is input to the front frame part 10r-F from the front, some of the load transmitted from the front frame part 10r-F to the rear frame part 10r-R can also be sustained by the sub-frame mount 20. Therefore, in the case of adopting the structure of the present embodiment, the load applied to the connection portion 19 can be further reduced when a load is input.

Also, the present invention is not limited to the above embodiment, and various design changes can be made without departing from the scope of the present invention. In the vehicle according to the above embodiment, although the battery as the power supply unit is disposed below the floor panel, the power supply unit is not limited to a battery, and may be, for example, a fuel cell.

What is claimed is:

1. A lower structure of a vehicle comprising:
   a pair of left and right front side frames which extend substantially in a longitudinal direction of a vehicle body in a front portion of the vehicle and are formed to have cross-sectional shapes that open upward at least at rear sections thereof;
   a vehicle body strength member coupled to a rear end portion of each of the front side frames;
   a floor panel which is disposed below a passenger compartment and has a part of a front section thereof joined to the rear sections of the pair of front side frames; and
   a power supply unit disposed below the floor panel,
   wherein the floor panel includes a pair of reinforcing panel portions which are respectively joined to the rear sections of the front side frames and cover the rear sections from above, and a floor panel main body portion which constitutes a portion other than the reinforcing panel portions,
   the reinforcing panel portions are formed to have a higher strength than that of the floor panel main body portion,
   the lower structure further comprises a pair of left and right side sills that extend below side portions of the passenger compartment,
   the respective rear end portions of the front side frames are coupled to the corresponding left and right side sills constituting the vehicle body strength member,
   the respective reinforcing panel portions are joined to the corresponding left and right side sills,
   the lower structure further comprises front pillars which are raised upward from a front portion of each side sill, and
   the reinforcing panel portions are joined respectively to the corresponding left and right front pillars.

2. The lower structure of the vehicle according to claim 1, further comprising:
   a dashboard panel which is raised upward from a front portion of the floor panel and partitions a front portion of the passenger compartment,
   wherein each of the reinforcing panel portions is joined to the dashboard panel.

3. A lower structure of a vehicle comprising:
   a pair of left and right front side frames which extend substantially in a longitudinal direction of a vehicle body in a front portion of the vehicle and are formed to have cross-sectional shapes that open upward at least at rear sections thereof;
   a vehicle body strength member coupled to a rear end portion of each of the front side frames;
   a floor panel which is disposed below a passenger compartment and has a part of a front section thereof joined to the rear sections of the pair of front side frames; and
   a power supply unit disposed below the floor panel,
   wherein the floor panel includes a pair of reinforcing panel portions which are respectively joined to the rear sections of the front side frames and cover the rear sections from above, and a floor panel main body portion which constitutes a portion other than the reinforcing panel portions,
   the reinforcing panel portions are formed to have a higher strength than that of the floor panel main body portion,
   the lower structure further comprises a pair of left and right side sills that extend below side portions of the passenger compartment,
   the respective rear end portions of the front side frames are coupled to the corresponding left and right side sills constituting the vehicle body strength member,
   the respective reinforcing panel portions are joined to the corresponding left and right side sills,
   the lower structure further comprises a dashboard panel which is raised upward from a front portion of the floor panel and partitions a front portion of the passenger compartment,
   each of the reinforcing panel portions is joined to the dashboard panel, and
   the reinforcing panel portions have reinforcing beads extending from the dashboard panel toward the side sills.

4. A lower structure of a vehicle comprising:
   a pair of left and right front side frames which extend substantially in a longitudinal direction of a vehicle body in a front portion of the vehicle and are formed to have cross-sectional shapes that open upward at least at rear sections thereof;
   a vehicle body strength member coupled to a rear end portion of each of the front side frames;

a floor panel which is disposed below a passenger compartment and has a part of a front section thereof joined to the rear sections of the pair of front side frames; and
a power supply unit disposed below the floor panel,
wherein the floor panel includes a pair of reinforcing panel portions which are respectively joined to the rear sections of the front side frames and cover the rear sections from above, and a floor panel main body portion which constitutes a portion other than the reinforcing panel portions,
the reinforcing panel portions are formed to have a higher strength than that of the floor panel main body portion,
each of the rear sections of the front side frames has a rear frame part disposed on a rear end side thereof, and a front frame part connected to a front portion side of the rear frame part, and
each of the reinforcing panel portions is joined to the rear frame part and the front frame part across a connection portion between the rear frame part and the front frame part.

5. The lower structure of the vehicle according to claim 4, further comprising:
a sub-frame mount for mounting a sub-frame on the front side frames,
wherein the sub-frame mount is joined to the rear frame part and the front frame part across the connection portion.

* * * * *